(12) United States Patent
Wu et al.

(10) Patent No.: US 8,097,149 B2
(45) Date of Patent: Jan. 17, 2012

(54) CATALYST AND METHOD FOR HYDRODESULFURIZATION OF HYDROCARBONS

(75) Inventors: Zhihua Wu, Lawrenceville, NJ (US);
Zhenhua Zhou, Pennington, NJ (US);
Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 616 days.

(21) Appl. No.: 12/140,629

(22) Filed: Jun. 17, 2008

(65) Prior Publication Data

US 2009/0308792 A1    Dec. 17, 2009

(51) Int. Cl.
*C10G 45/60* (2006.01)

(52) U.S. Cl. .......... 208/209; 208/208 R; 208/216 R; 208/217; 208/230; 208/231; 208/243; 208/244; 502/102; 502/103; 502/121; 502/122; 502/123; 502/124; 502/208; 502/210; 502/211; 502/213; 502/328; 502/340; 502/344

(58) Field of Classification Search .......... 502/102–103, 502/121–124, 208, 210–211, 213, 328, 340, 502/344; 208/209, 216 R, 217, 243–244, 208/249
See application file for complete search history.

(56) References Cited

U.S. PATENT DOCUMENTS

| | | | |
|---|---|---|---|
| 3,362,972 A | 1/1968 | Kollar | |
| 3,578,690 A | 5/1971 | Becker | |
| 3,595,891 A | 7/1971 | Cavitt | |
| 3,953,362 A | 4/1976 | Lines et al. | |
| 3,983,028 A | 9/1976 | McCollum et al. | |
| 4,022,681 A | 5/1977 | Sheng et al. | |
| 4,066,561 A | 1/1978 | Nnadi | |
| 4,125,455 A | 11/1978 | Herbstman | |
| 4,134,825 A | 1/1979 | Bearden, Jr. et al. | |
| 4,151,070 A | 4/1979 | Allan et al. | |
| 4,181,601 A | 1/1980 | Sze | |
| 4,191,636 A * | 3/1980 | Fukui et al. | 502/247 |
| 4,192,735 A | 3/1980 | Aldridge et al. | |
| 4,305,808 A | 12/1981 | Bowes et al. | |
| 4,325,802 A | 4/1982 | Porter et al. | |
| 4,352,729 A | 10/1982 | Jacquin et al. | |
| 4,411,768 A | 10/1983 | Unger et al. | |
| 4,422,927 A | 12/1983 | Kowalcyzk et al. | |
| 4,435,314 A | 3/1984 | van de Leemput et al. | |
| 4,454,023 A | 6/1984 | Lutz | |
| 4,465,630 A | 8/1984 | Akashi et al. | |
| 4,467,049 A | 8/1984 | Yoshii et al. | |
| 4,485,004 A | 11/1984 | Fisher et al. | |
| 4,564,441 A * | 1/1986 | Kukes et al. | 208/108 |
| 4,581,344 A | 4/1986 | Ledoux et al. | |
| 4,585,545 A | 4/1986 | Yancey, Jr. et al. | |
| 4,590,172 A | 5/1986 | Isaacs | |
| 4,592,827 A | 6/1986 | Galiasso et al. | |
| 4,592,830 A | 6/1986 | Howell et al. | |
| 4,606,809 A | 8/1986 | Garg | |
| 4,633,001 A | 12/1986 | Cells | |
| 4,652,311 A | 3/1987 | Gulla et al. | |
| 4,652,647 A | 3/1987 | Schlosberg et al. | |
| 4,693,991 A | 9/1987 | Bjornson et al. | |
| 4,695,369 A | 9/1987 | Garg et al. | |
| 4,707,245 A | 11/1987 | Baldasarri et al. | |
| 4,707,246 A | 11/1987 | Gardner et al. | |
| 4,713,167 A | 12/1987 | Reno et al. | |
| 4,716,142 A | 12/1987 | Laine et al. | |
| 4,734,186 A | 3/1988 | Parrott et al. | |
| 4,762,607 A | 8/1988 | Aldridge et al. | |
| 4,762,814 A | 8/1988 | Parrott et al. | |
| 4,765,882 A | 8/1988 | Aldridge et al. | |
| 4,770,764 A | 9/1988 | Ohtake et al. | |
| 4,802,972 A | 2/1989 | Kukes et al. | |
| 4,812,228 A | 3/1989 | Angevine et al. | |
| 4,824,611 A | 4/1989 | Cells | |
| 4,834,865 A | 5/1989 | Kukes et al. | |
| 4,837,193 A | 6/1989 | Akizuki et al. | |
| 4,863,887 A | 9/1989 | Ohtake et al. | |
| 5,017,712 A | 5/1991 | Usui et al. | |
| 5,114,900 A | 5/1992 | King | |
| 5,171,916 A | 12/1992 | Le et al. | |
| 5,254,240 A | 10/1993 | Galiassco et al. | |

(Continued)

FOREIGN PATENT DOCUMENTS

| | | |
|---|---|---|
| CA | 2004882 | 6/1991 |
| CA | 2088402 | 7/1993 |
| DE | 2324441 | 12/1973 |
| DE | 2421934 | 11/1974 |
| EP | 0 199 399 | 10/1986 |
| EP | 0559399 | 9/1993 |
| EP | 1043069 | 10/2000 |
| JP | 06346064 | 12/1994 |
| JP | 2003193074 | 7/2003 |
| WO | WO 2006116913 | 11/2006 |

OTHER PUBLICATIONS

Office Action dated Apr. 2, 2009 cited in U.S. Appl. No. 11/327,085.

(Continued)

*Primary Examiner* — Robert J. Hill, Jr.
*Assistant Examiner* — Brian McCaig
(74) *Attorney, Agent, or Firm* — Workman Nydegger

(57) ABSTRACT

Oil soluble catalysts are used in a process to hydrodesulfurize petroleum feedstock having a high concentration of sulfur-containing compounds and convert the feedstock to a higher value product. The catalyst complex includes at least one attractor species and at least one catalytic metal that are bonded to a plurality of organic ligands that make the catalyst complex oil-soluble. The attractor species selectively attracts the catalyst to sulfur sites in sulfur-containing compounds in the feedstock where the catalytic metal can catalyze the removal of sulfur. Because the attractor species selectively attracts the catalysts to sulfur sites, non-productive, hydrogen consuming side reactions are reduced and greater rates of hydrodesulfurization are achieved while consuming less hydrogen per unit sulfur removed.

39 Claims, No Drawings

U.S. PATENT DOCUMENTS

| | | | |
|---|---|---|---|
| 5,332,489 A * | 7/1994 | Veluswamy | 208/56 |
| 5,332,709 A | 7/1994 | Nappier et al. | |
| 5,358,634 A | 10/1994 | Rankel | |
| 5,364,524 A | 11/1994 | Partridge et al. | |
| 5,372,705 A | 12/1994 | Bhattacharya et al. | |
| 5,474,977 A | 12/1995 | Gatsis | |
| 5,578,197 A | 11/1996 | Cyr et al. | |
| 5,622,616 A | 4/1997 | Porter et al. | |
| 5,866,501 A | 2/1999 | Pradhan et al. | |
| 5,868,923 A | 2/1999 | Porter et al. | |
| 5,871,638 A | 2/1999 | Pradhan et al. | |
| 5,916,432 A | 6/1999 | McFarlane et al. | |
| 5,935,419 A | 8/1999 | Khan et al. | |
| 5,954,945 A | 9/1999 | Cayton et al. | |
| 5,962,364 A | 10/1999 | Wilson, Jr. et al. | |
| 6,059,957 A | 5/2000 | Khan et al. | |
| 6,068,758 A | 5/2000 | Strausz | |
| 6,093,824 A | 7/2000 | Reichle et al. | |
| 6,136,179 A | 10/2000 | Sherwood et al. | |
| 6,139,723 A | 10/2000 | Pelrine et al. | |
| 6,214,195 B1 | 4/2001 | Yadav et al. | |
| 6,274,530 B1 | 8/2001 | Cayton et al. | |
| 6,379,532 B1 | 4/2002 | Hoehn et al. | |
| 6,455,594 B1 | 9/2002 | Tsuji | |
| 6,462,095 B1 | 10/2002 | Bonsel et al. | |
| 6,596,155 B1 | 7/2003 | Gates et al. | |
| 6,660,157 B2 | 12/2003 | Que et al. | |
| 6,686,308 B2 | 2/2004 | Mao et al. | |
| 6,712,955 B1 | 3/2004 | Hou et al. | |
| 6,884,340 B1 | 4/2005 | Bogdan | |
| 6,916,762 B2 | 7/2005 | Shibuya et al. | |
| 7,011,807 B2 | 3/2006 | Zhou et al. | |
| 7,090,767 B2 | 8/2006 | Kaminsky et al. | |
| 7,670,984 B2 | 3/2010 | Wu et al. | |
| 7,842,635 B2 | 11/2010 | Zhou et al. | |
| 7,951,745 B2 | 5/2011 | Zhou et al. | |
| 2002/0179493 A1 | 12/2002 | Etter | |
| 2003/0094400 A1 | 5/2003 | Levy et al. | |
| 2003/0171207 A1 | 9/2003 | Shih et al. | |
| 2004/0147618 A1 | 7/2004 | Lee et al. | |
| 2005/0109674 A1 | 5/2005 | Klein | |
| 2005/0241991 A1 | 11/2005 | Lott et al. | |
| 2005/0241992 A1 | 11/2005 | Lott et al. | |
| 2005/0241993 A1 | 11/2005 | Lott et al. | |
| 2005/0258073 A1 | 11/2005 | Oballa et al. | |
| 2005/0279670 A1 | 12/2005 | Long et al. | |
| 2006/0079396 A1 | 4/2006 | Saito | |
| 2006/0224000 A1 | 10/2006 | Papp et al. | |
| 2006/0254956 A1 | 11/2006 | Khan | |
| 2006/0289340 A1 | 12/2006 | Brownscombe et al. | |
| 2007/0012595 A1 | 1/2007 | Brownscombe et al. | |
| 2007/0090018 A1 | 4/2007 | Keusenkothen et al. | |
| 2007/0158236 A1 | 7/2007 | Zhou et al. | |
| 2007/0158238 A1 | 7/2007 | Wu et al. | |
| 2007/0163921 A1 | 7/2007 | Keusenkothen et al. | |
| 2007/0175797 A1 | 8/2007 | Iki et al. | |
| 2007/0209965 A1 | 9/2007 | Duddy et al. | |
| 2009/0173666 A1 | 7/2009 | Zhou et al. | |
| 2010/0051507 A1 | 3/2010 | Wu et al. | |

OTHER PUBLICATIONS

Database CA [online] Chemical Abstracts Service retrieved from STN Database accession No. 1991:42412.

Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998, XP009117504.

ChemBioFinder.com, Scientific Database Gateway, Molecular Profile Report for cobalt benzoate, at least as early as Sep. 10, 2010.

Office Action dated Mar. 8, 2010 cited in U.S. Appl. No. 11/461,652.

Notice of Allowance dated Aug. 15, 2010 cited in U.S. Appl. No. 11/461,652.

Office Action dated Sep. 16, 2010 cited in U.S. Appl. No. 11/968,861.

Office Action dated Sep. 20, 2010 cited in U.S. Appl. No. 11/968,934.

Office Action dated Jan. 25, 2011 cited in U.S. Appl. No. 11/968,934.

Papaioannou et al., "Alkali-Metal- and Alkaline-Earth-Promoted Catalysts for Coal Liquefaction Applications", Energy & Fuels, vol. 4, No. 1, pp. 38-42 (1990).

Office Action dated Sep. 30, 2009 cited in U.S. Appl. No. 11/461,652.

Notice of Allowance dated Oct. 27, 2009 cited in U.S. Appl. No. 11/327,085.

U.S. Appl. No. 11/327,249, filed Jan. 6, 2006, Zhou et al.

Molecular Profile Report, Cobalt Benzoate, http://chemfinder.cambridgesoft.com/chembiofinder/forms/search/contentarea/chembiovizsearch.aspx?formgroupid=8&appname=chembiofinder& allowfullsearch=true&keeprecordcount synchronizedflase& searchcriteraid=47searchcriteravalue=932-69-4¤tindex=0.

U.S. Appl. No. 11/461,652, filed Aug. 5, 2010, Notice of Allowance.

U.S. Appl. No. 11/968,861, filed Feb. 2, 2011, Notice of Allowance.

* cited by examiner

CATALYST AND METHOD FOR HYDRODESULFURIZATION OF HYDROCARBONS

BACKGROUND OF THE INVENTION

1. The Field of the Invention

The present invention relates generally to the desulfurization of crude oil and other hydrocarbons, more particularly hydrodesulfurization. In particular, the present invention relates to the use of an oil-soluble, bifunctional catalyst that is used in a hydrodesulfurization process to selectively remove sulfur.

2. Related Technology

World demand for refined fossil fuels is ever-increasing and will eventually outstrip the supply of high quality crude oil. As the shortage of high quality crude oil increases, there is an increasing demand to find better ways to exploit lower quality feedstocks and extract fuel values from them.

Lower quality feedstocks are characterized by relatively high quantities of hydrocarbons that have a boiling point of 524° C. (975° F.) or higher. They also typically contain relatively high concentrations of sulfur, nitrogen and/or metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include sour crude, heavy crude, sour-heavy crude, oil sands bitumen, and bottom of the barrel and residuum left over from conventional refinery processes (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

Despite the industry's extensive research there are certain crude oils, distillates, and/or by-products of the various refining processes that are difficult to upgrade. Converting heavy oil into useful end products requires extensive processing, including reducing the boiling point of the heavy oil, increasing the hydrogen-to-carbon ratio, and removing impurities such as metals, sulfur, nitrogen and carbon forming compounds. Hydrocarbons containing these types of hydrocarbons tend to form coke under many refining conditions, which can foul reactors and reduce the yield of useful or high-value petroleum products. Consequently, these products are often used "as is" in their low-value form.

There is a persistent desire in the industry to convert these low-value feedstocks into high-value petroleum. For example, the price premium paid for a barrel of sweet-light crude oil versus a barrel of sour-heavy crude oil ranges from about $5-20, depending on the overall price of oil.

However, even with the large price premium paid for high-quality petroleum, it is often not economical to desulfurize low-value petroleum by hydrodesulfurization. This is due at least in part to low desulfurization rates coupled with high consumption of hydrogen. Moreover, the catalysts used in hydrodesulfurization processes become fouled or rapidly undergo catalyst deactivation. The undesirable reactions and fouling involved in hydrodesulfurization of heavy oil greatly increases the materials and maintenance costs of processing heavy oils.

Even small improvements in catalyst performance can have a significant benefit to the cost of the hydrodesulfurization process due to the increase in output and/or the reduced use of the catalyst. Despite the continuing pressures to catalytically upgrade heavy hydrocarbons or low-value feedstocks, there is a long-felt but unsatisfied need in the industry for processes and catalysts that increase the efficiency and economy of upgrading low-value petroleum materials by hydrodesulfurization.

BRIEF SUMMARY OF THE INVENTION

The present invention relates to a process for hydrodesulfurization of hydrocarbons having a high concentration of sulfur. The present process improves the economic viability of hydrodesulfurization of hydrocarbons having a high concentration of sulfur by using a bifunctional catalyst to remove sulfur from the hydrocarbon and upgrading it to higher value petroleum (e.g., sweet-light crude).

In one embodiment of the present invention, the process for hydrodesulfurization includes steps of (1) providing a hydrocarbon material that has a high sulfur content, (2) providing a plurality of bifunctional, oil-soluble catalyst complexes, (3) blending the plurality of catalyst complexes with the petroleum material to form a conditional feedstock mixture, and (4) processing the conditional feedstock mixture to form a product having a decreased sulfur content compared to the initial hydrocarbon material.

In one embodiment, the process can be used to desulfurize low-value, high-sulfur petroleum materials using a plurality of oil-soluble, bifunctional catalyst complexes. Each complex includes at least one attractor species, at least one catalytic metal, and at least one organic ligand that makes the complex oil-soluble. The attractor species selectively attracts the catalyst complex to sulfur sites in the petroleum material so that the catalytic metal atoms are in close proximity and able to selectively catalyze reactions that remove sulfur from sulfur-containing compounds in the petroleum material. The ability of the attractor species to attract the catalytic complexes to sulfur sites where the catalytic metal is able to selectively remove sulfur improves the efficiency of the desulfurization process and reduces the incidence of side-reactions that consume (or waste) hydrogen as compared to catalysts that do not have an oil-soluble attractor species.

The attractor species included in the catalytic complex of the present invention comprises one or more atomic or molecular species that are useful for selectively attracting the catalytic complex to sulfur sites in the sulfur-containing compounds in the petroleum material. Without being bound to any particular theory, it is believed that at least some attractor species are selectively attracted to sulfur sites by virtue of the attractor species having at least one open p-orbital that is able to accommodate the unbound p-orbital electrons that are present on sulfur.

In one embodiment, attractor species of the present invention include, but are not limited to, atoms of and/or functional groups that contain sodium, calcium, phosphorus, sulfur, or nitrogen, and combinations thereof. In a preferred embodiment, the attractor species is phosphorus or a phosphorus-containing functional group.

The catalytic metal or metals included in the catalysts of the present invention are metals that are useful for hydrodesulfurization of sulfur-containing compounds found in many petroleum materials. In one embodiment the catalytic metal is selected from group IV-B metals, group V-B metals, group VI-B metals, group VII-B metals, or group VIII-B metals, and combinations thereof. Examples of suitable catalytic metals that are useful for catalyzing hydrodesulfurization reactions include, but are not limited to, iron, nickel, cobalt, molybdenum, tungsten, chromium, vanadium, titanium, or manganese, and combinations thereof. In a preferred embodiment, the catalytic metal is molybdenum.

The one or more organic ligands bonded to the attractor species and/or the catalytic metal include aliphatic and aromatic species having at least one functional group that serves as a linkage between the ligand and the attractor species and/or the catalytic metal. Aliphatic species may either be straight chained, branched, or cyclic. Suitable functional groups include, but are not limited to, alcohols, carboxylic acids, esters, phospho esters, thiols, thio esters, thio ethers, or ketones, and combinations thereof.

In one embodiment of the present invention, the ligand or ligands bonded to the attractor species and/or the catalytic metal include at least one aromatic group that can form pi-pi ($\pi$-$\pi$) stacking interactions with each other in order to form the catalytic complex and/or with sulfur-containing aromatic compounds in the petroleum material. The aromatic group of the ligand is typically a substituted or unsubstituted five or six member aromatic ring (e.g., aryl group). The aromatic group can also be alkylated or functionalized in other ways to provide desired steric hindrances and/or bonding interactions with other ligands or molecules in the hydrocarbon feedstock, as long as the complexes including the ligands remain oil soluble.

In a preferred embodiment, the organic ligand comprises a naphthenate having at least one carboxylic acid functional group. Naphthenates are a non-specific mixture of several fused-ring cyclopentyl and cyclohexyl carboxylic acids with molecular weight of 120 to well over 700 atomic mass units. The most prevalent naphthenates are carboxylic acids with a carbon backbone of 9 to 20 carbons.

Suitable petroleum materials that may be upgraded according to the present process include, but not limited to, sour crude, sour-heavy crude, by-products from other refining processes, and combinations thereof. Crude oils and refinery by-products having a high sulfur content are less desired than petroleum products having a low sulfur content. According to one embodiment of the present invention, the petroleum material is a crude oil such as sour crude or sour-heavy crude having a sulfur content greater than 0.5 wt %.

The catalyst complexes including a plurality of attractor species, catalytic metals, and organic ligands are blended into the petroleum material to form a conditional feedstock mixture. The catalyst can be blended directly into the petroleum material or the catalyst can be diluted in one or more steps prior to blending into the petroleum material. The step-wise dilution can facilitate intimate mixing of the catalyst and the petroleum material. It has been found that pre-blending the catalyst with a hydrocarbon diluent to form a precursor mixture prior to blending the diluted precursor mixture with the petroleum material greatly aids in thoroughly and intimately blending the catalyst complex within the petroleum material, particularly in the relatively short period of time required for large-scale industrial operations to be economically viable.

The catalyst complexes are blended with the petroleum material to achieve the desired metal concentration. Preferably, the concentration of the catalytic metal provided by the catalysts complexes in the homogeneous feedstock mixture is in a range from about 1 wppm to about 1000 wppm. More preferably, the concentration of the catalytic metal is in a range from about 25 wppm to about 400 wppm. Most preferably, the concentration of the catalytic metal is about 50 wppm.

In one embodiment, the process further includes processing the homogeneous feedstock mixture in a reactor under hydrodesulfurization conditions in the presence of gaseous hydrogen so as to form a product having a decreased sulfur content compared to the initial feedstock material.

Under hydrodesulfurization conditions, the reaction temperature is selected to promote the removal of sulfur rather than hydrocracking. The particular temperature for a given reaction can depend on the hydrocarbon feedstock being used and the decomposition temperature of the catalyst. In general, the hydrodesulfurization temperature can be in a range from about 300° C. to about 450° C. or higher. Lower temperatures within the range are typically preferred to hinder decomposition of the catalyst. In a preferred embodiment, the hydrodesulfurization temperature is in a range between about 410° C. and about 430° C.

Under hydrodesulfurization conditions, any suitable pressure can be used in the hydrodesulfurization process of the invention. The reaction pressure can range from about atmospheric pressure to about 10,000 PSIG. Preferably the pressure is in a range from about 450 PSIG and about 1900 PSIG. More preferably, the pressure is in a range from about 1400 PSIG and about 1500 PSIG.

Preferably, hydroprocessing the petroleum material under hydrodesulfurization conditions in the presence of the bifunctional, oil soluble catalyst reduces the sulfur content of the product by at least 40% as compared to the starting material. More preferably, the sulfur content of the product is reduced by at least 50% as compared to the starting material. Most preferably, the sulfur content of the product is reduced by at least 60% as compared to the starting material.

The hydrodesulfurization catalyst can be used in various kinds of reactors and desulfurization processes to upgrade hydrocarbon materials having an initially high sulfur content. The hydrodesulfurization catalyst of the present invention can more effectively and economically hydrodesulfurize petroleum material and/or increase conversion rates because the process of the present invention achieves a high rate of hydrodesulfurization while consuming less hydrogen than can be achieved with previous methods and catalysts.

These and other benefits and features of the present invention will become more fully apparent from the following description and appended claims as set forth hereinafter.

DETAILED DESCRIPTION OF EXAMPLE EMBODIMENTS

I. Introduction and Definitions

The present invention relates to a process for hydrodesulfurization of hydrocarbons having a high concentration of sulfur. The process improves the economic viability of hydrodesulfurization of hydrocarbons having a high concentration of sulfur by using a bifunctional catalyst to remove sulfur from the hydrocarbon and upgrading it to higher value petroleum (e.g., sweet-light crude).

For the purposes of this invention, the terms "sweet crude" and "sweet-light crude" refer to crude oils having low concentrations (i.e., less than 0.5%) of sulfur-containing impurities such as hydrogen sulfide ($H_2S$), mercaptans or thiols (R—SH), and thio ethers ($R^1$—S—$R^2$). A price premium is generally paid for "sweet crude" and "sweet-light crude" as compared to so-called "sour crude" and/or "sour-heavy crude." High quality, low sulfur crude oil is commonly used for processing into gasoline and is in high demand. "Sweet-light crude" is the most sought-after version of crude oil as it contains a disproportionately large amount of the fractions that are used to process gasoline, kerosene, and high-quality diesel.

For the purposes of this invention, the terms "sour crude" and "sour-heavy crude" refer to crude oils that include high concentrations (i.e., greater than about 1%) of sulfur-containing impurities such as hydrogen sulfide ($H_2S$), mercaptans or thiols (R—SH), and thio ethers ($R^1$—S—$R^2$). Such oil is generally less valuable than "sweet crude" and or "sweet-light crude." Such oil also generally requires desulfurization in order to be useful for production of most high-value, refined petroleum products.

For purposes of this invention, the term "refining by-product" is a hydrocarbon product obtained from refining a petroleum distillate where the "refining by-product" is lower in value and produced in lower quantities than at least one other hydrocarbon product produced during the same refining process.

II. Components Used to Make Oil Soluble Catalyst

The catalysts of the invention include a plurality of catalyst complexes, which include at least one attractor species, at least one catalytic metal, and a plurality of organic ligands that bond to the attractor species and the catalytic metal so as to form the catalyst complex. Optionally, the catalyst complexes can be dispersed in a solvent or carrier. The following components can be used to manufacture the catalysts of the invention.

A. Attractor Species

The attractor species is an atom or a functional group selected for its ability to bond with the organic ligand and selectively attract the catalyst complexes to sulfur sites in sulfur-containing compounds in the petroleum material. Examples of suitable attractor species include, but are not limited to, atoms of and/or functional groups containing sodium (Na), calcium (Ca), phosphorus (P), sulfur (S), or nitrogen (N), and combinations thereof In a preferred embodiment, the attractor species is phosphorus.

Without being bound to one particular theory, it is believed that at least some attractor species are selectively attracted to sulfur sites by virtue of the attractor species having at least one open p-shell that is able to accommodate the unbound p-shell electrons that are present on sulfur.

Another theory that can be used to explain the affinity of some attractor species for sulfur is known as the hard/soft acid/base (HSAB) theory. The basic tenet of the theory is that soft acids prefer to interact with soft bases, whereas hard acids prefer to interact with hard bases. HSAB theory relates to atomic size and the number of electrons surrounding the atomic nucleus. Although there are exceptions to the general rule, large atoms with a large number of electrons (e.g., mercury) are "soft," small atoms with a small number of electrons (e.g., sodium) are "hard," and some atoms are borderline (i.e., neither hard nor soft).

Depending on its coordination state, sulfur can either be borderline or soft. This means that sulfur will tend to interact with species that are either borderline or soft. For example, interactions between sulfur and some phosphorous species are favored according to HSAB theory because sulfur can be a soft or borderline base while phosphorous can be a soft or borderline acid.

B. Catalytic Metals

The catalytic metal is a transition metal selected for its ability to form a bond with the organic ligand and to catalytically remove sulfur from sulfur-containing compounds in the in the petroleum material. In one embodiment the catalytic metal catalytic metal is selected from a group that includes group IV-B metals, group V-B metals, group VI-B metals, group VII-B metals, or group VIII-B metals, and combinations thereof. Examples of suitable catalytic metals include, but are not limited to, iron (Fe), nickel (Ni), cobalt (Co), molybdenum (Mo), tungsten (W), chromium (Cr), vanadium (V), titanium (Ti), or manganese (Mn), and combinations thereof. In a preferred embodiment, the catalytic metal is molybdenum.

The catalytic metals can be used alone or in combination. In one embodiment, foe example, two group VIII-B metals (e.g., iron and nickel) are used together in the catalytic complex along with an attractor species. In another embodiment, a group VI-B metal and a group VIII-B metal (e.g., molybdenum and nickel) are used together in the catalytic complex along with an attractor species. The use of two or more catalytic metals in a catalytic complex can provide superior results compared to the metals used alone.

C. Organic Ligands

The organic ligands are organic compounds that can form a complex with the attractor species and the catalytic metals. The organic ligands of the present invention can take on many forms, provided that they are capable of solublizing the attractor species and the catalytic metal in the petroleum material that is being desulfurized. Suitable organic ligands include aliphatic and aromatic species. Suitable aliphatic species may be straight chains, branched chains, or cyclic. Suitable aromatic species may include single-ring or fused-ring structures and any substituents bonded thereto so long as the aromatic ligand is capable of bonding to the attractor species and/or catalytic metal or metals.

Typically, the organic ligand will include at least one functional group that can form a bond between the ligand and the attractor species and/or the catalytic metal. In one embodiment, the available functional group on the organic ligand is an acid group. Examples of suitable acid groups include carboxylic acids, phosphonic acids, sulfonic acids, boric acids, nitric acid, and combinations and derivatives thereof. Other suitable functional groups include, but are not limited to, alcohols, esters, phospho esters, thiols, thio esters, thio ethers, or ketones, and combinations and derivatives thereof.

Examples of suitable organic ligands include organic compounds having between 2 and 20 carbon atoms and at least one functional group suitable for forming a bond with the attractor species and/or the catalytic metal to form the catalytic complex. In some embodiments, the organic ligand may include as many as 40 or 50 carbon atoms. In a preferred embodiment, the organic agent is a carboxylic acid. Suitable carboxylic acids include aliphatic acids, alicyclic acids, aromatic acids, and phosphorus-containing acids. Suitable aliphatic acids include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, carboxylic acids with side chains located at the α, β, or γ positions (e.g., 2-ethyl butanoic acid, 2-methyl pentanoic acid, 2-ethyl hexanoic acid), and the like. Alicyclic acids include cyclohexanoic, cyclododecanoic and the like. Aromatic acids may contain one or two fused rings and contain from 7 to 20 carbon atoms where the carboxyl group may or may not be attached to the ring, such as benzoic, 1 or 2 naphthoic, o-, m-, p-toluic, phenylacetic, 1 or 2 naphthalene acetic, phenylbutyric acid and the like. Phosphorus-containing organic compounds include bis(2-ethylhexyl) phosphate, and the like.

In one embodiment, the organic ligand is a diacid and/or a diprotic acid. Examples of suitable acid groups include carboxylic acids, phosphonic acids, sulfonic acids, boric acids and derivatives thereof. Examples of specific compounds include oxalic acid, oxamic acid, malonic acid, succinic acid, glutaric acid, propylphosphonic acid, tert-Butylphosphonic acid, 3-(Methylphosphinico)propionic acid, dibutyl phosphate, bis(2-ethylhexyl) phosphate, sulfoacetic acid, methylboronic acid, isopropylboronic acid, butylboronic acid, isobutylboronic acid and their derivatives.

In one embodiment of the present invention, the ligand or ligands bonded to the attractor species and/or the catalytic metal include at least one aromatic group that can form pi-pi ($\pi$-$\pi$) stacking interactions with each other in order to form the catalytic complex and/or with sulfur-containing aromatic compounds in the hydrocarbon feedstocks. The aromatic group of the ligand is typically a substituted or unsubstituted five or six member aromatic ring (e.g., aryl group). The aromatic group can also be alkylated or functionalized in other ways to provide desired steric hindrances and/or bonding interactions with other ligands or molecules in the hydrocarbon feedstock, so long as the complexes including the ligands remain oil soluble.

In a preferred embodiment, at least one of the organic ligands used to form the catalytic complex is 2-ethyl hexanoic acid. 2-ethyl hexanoic acid is preferred for its solubility in heavy oil and its relatively low cost. In another preferred embodiment, at least one of the organic ligands used to form the catalytic complex is a naphthenate. Naphthenates are a non-specific mixture of several fused-ring cyclopentyl and cyclohexyl carboxylic acids with molecular weight of 120 to well over 700 atomic mass units. The most prevalent naphthenates are carboxylic acids with a carbon backbone of 9 to 20 carbons.

Those skilled in the art will recognize that the organic ligand molecules can be modified during the reaction with the attractor species and/or the catalytic metal. For example, in the reaction of a carboxylic acid with molybdenum the organic agent molecules can lose hydrogen to become a carboxylate anion.

In some cases, the organic ligand can function as a solvent for the reaction. This is typically the case where the organic ligand is a liquid under the reaction conditions (e.g., 2-ethyl hexanoic acid). However, if needed, other solvents can be used. The additional solvent should dissolve the organic ligand and the attractor species and/or the catalytic metal and not interfere with the reaction between them. Suitable solvents include decant oil, liquid paraffin wax, benzene, toluene, xylene, naphtha, mineral oil, mineral spirits, combinations thereof, and the like.

D. Reducing Agents

Optionally, a reducing agent can be added to the reaction mixture during the formation of the catalyst complexes to cause the attractor species and/or the catalytic metal and organic ligands to more readily form a complex and/or to obtain attractor species and catalytic metal complexes with a desired number of ligands. The use of a reducing agent has been found to be particularly useful for the formation of complexes with molybdenum atoms in combination with an acid bearing ligand. In one embodiment, the reducing agent can also be used to maintain at least a portion of the molybdenum atoms in an oxidation state below 4+. While the use of reducing agents in combination with molybdenum is preferred, one will appreciate that reducing agents can be used to manipulate the oxidation state of any attractor species and/or catalytic metal that is within the scope of the present disclosure.

Any reducing agent that can reduce the attractor species and/or the catalytic metal can be used. In a preferred embodiment, the reducing agent is a strong reducing agent under the reaction conditions described herein. Suitable reducing agents include methane, ethane, olefins such as ethylene and propylene, aldehydes such as formaldehyde, and hydrogen. Hydrogen gas is a particularly preferred reducing agent for its strong reducing potential.

The suitability of the reducing agent often depends on the temperature at which the reaction is performed. At higher temperatures (e.g., 150° C.), organic reducing agents such as methane and formaldehyde have suitable reducing potential. However, at low temperatures (e.g., below 50° C.) or room temperature it can be advantageous to use a stronger reducing agent such as hydrogen gas.

III. Methods of Making Hydrodesulfurization Catalyst

The process for making the hydrodesulfurization catalysts according to the present invention can be carried out by reacting a plurality of organic ligand molecules with a plurality of attractor species and/or a plurality of catalytic metal species. An organic ligand that includes a functional group capable of bonding with the attractor species and/or the catalytic metal is mixed together with the attractor species and/or the catalytic metal and optionally one or more solvents to form a mixture. The attractor species and/or the catalytic metal are allowed to react with the functional group available on organic ligand to form a catalytic complex. The attractor species and the catalytic metal can be reacted with organic ligands separately and then mixed to form a catalytic complex, or the attractor species and the catalytic metal can be mixed and reacted with organic ligands to form a catalytic complex.

The optimal reaction temperature for carrying out this reaction will depend on the particular attractor species and/or the catalytic metal and the organic ligand. In one embodiment, the temperature for reacting the catalytic metal (e.g., with benzene carboxylic acid) is typically in a range from about 100° C. to about 300° C., more preferably about 140° C. to about 210° C.

In one embodiment, the catalyst of the invention includes at least two different catalytic metals. The bimetallic or multimetallic catalysts can be manufactured by making separate catalyst complexes using a single metal and then combining the complexes to form the bimetallic or multimetallic catalysts. Any combination of metals can be used. In one embodiment, the ratio of the first metal (e.g., molybdenum) to the second metal (e.g., nickel) is in a range from about 50:1 to about 1:20, more preferably about 10:1 to about 1:5, and most preferably in a range from about 6:1 to about 1:1. The first and second catalytic metals can be complexed using the same or different organic ligands.

In one embodiment of the invention, the reaction of the attractor species and/or the catalytic metal with the organic ligand is carried out in the presence of a reducing agent. The use of a reducing agent can produce a catalyst with the attractor species and/or catalytic metal in a lower oxidation state and thereby reduce the amount of organic ligands per catalytic complex. In addition, the use of a reducing agent can improve the solubility of the catalyst in the petroleum material that is being desulfurized. In a preferred embodiment, the reducing agent used is hydrogen.

IV. Oil Soluble Catalyst

The desulfurization methods of the present invention use an oil-soluble, bi-functional catalyst that is useful for upgrading petroleum materials that contain a high percentage of sulfur-containing compounds. In one embodiment, the catalyst complexes have the following general structures:

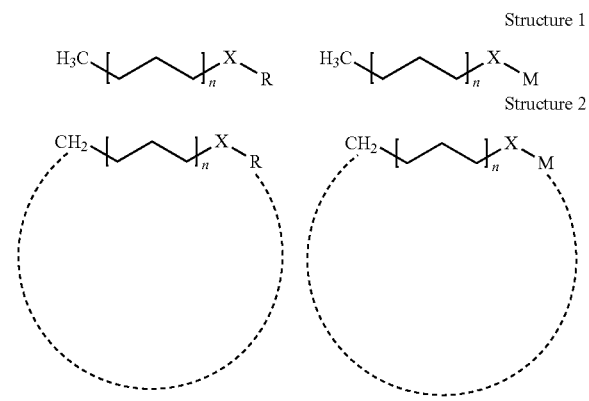

Structure 1

Structure 2

In the foregoing structures, R, which represents the attractor species and M, which represents the catalytic metal are each bonded to an organic ligand. The organic ligand can have a variable chain length, as indicated by the brackets and the n subscript. The organic ligand can be a linear or branched chain, as represented by Structure 1, or the organic ligand can be cyclic, as represented by Structure 2. Examples of suitable organic ligands include organic compounds having between 2 and 20 carbon atoms and at least one functional group suitable for forming a bond with the attractor species and/or the catalytic metal to form the catalytic complex. In some embodiments, the organic ligand may include as many as 40 or 50 carbon atoms. Suitable organic ligands include aliphatic and aromatic species. Suitable aliphatic species may be straight chains, branched chains, or cyclic. Suitable aromatic species may include single-ring or fused-ring structures and any substituents bonded thereto so long as the aromatic ligand is capable bonding to the attractor species and/or catalytic metal or metals.

Typically, the organic ligand will include at least one functional group that can form a bond between the ligand and the attractor species and/or the catalytic metal. In the foregoing structure, the functional group is indicated by X. In one embodiment, the available functional group on the organic ligand is an acid group. Examples of suitable acid groups include carboxylic acids, phosphonic acids, sulfonic acids, boric acids, nitric acid, and combinations and derivatives thereof. Other suitable functional groups include, but are not limited to, alcohols, esters, phospho esters, thiols, thio esters, thio ethers, or ketones, and combinations and derivatives thereof.

In the foregoing structure, R can be any attractor species selected from the group consisting of atoms of or functional groups containing sodium, calcium, phosphorus, sulfur, or nitrogen, and combinations thereof. In a preferred embodiment, the attractor species is phosphorus or a phosphorus-containing moiety. M can be any group IV-B metal, group V-B metal, group VI-B metal, group VII-B metal, group VIII-B metal, or a combination of these. More preferably, M is selected from the group comprising, iron, nickel, cobalt, molybdenum, tungsten, chromium, vanadium, titanium, or manganese, and combinations thereof. In a preferred embodiment, M is molybdenum.

In one embodiment, the organic ligand bonded to the attractor species is separate from the organic ligand bonded to the catalytic metal or metals. That is, while the molecules that include the attractor species and the catalytic metal(s) may be mixed together, they may be free to separate.

In another embodiment, the organic ligand bonded to the attractor species and the organic ligand bonded to the catalytic metal or metals cross-react to form a polymolecular catalytic complex. For example, if the organic ligands are capable of pi-pi ($\pi$-$\pi$) stacking, the molecules may stack together to form a polymolecular catalytic complex. In yet another example, there may be spontaneous exchange reactions between the attractor species molecules and catalytic metal molecules to form a catalytic complex.

In yet another embodiment, the attractor species and the catalytic metal are reacted with a bi-functional organic ligand to form a catalytic complex. For example, a dicarboxylic acid organic ligand can form a catalytic complex that includes both the attractor species and the catalytic metal attached to a single ligand. Suitable examples of dicarboxylic acids include, but are not limited to, oxalic acid, malonic acid, succinic acid, glutaric acid, adipic acid, pimelic acid, suberic acid, azelaic acid, sebacic acid, phthalic acid, o-phthalic acid, m-phthalic acid, p-phthalic acid, isophthalic acid, terephthalic acid, naphthalene dicarboxylic acid, and the like.

V. Methods For Hydrodesulfurization of a Hydrocarbon

The catalysts of the present invention can be used to hydrodesulfurize petroleum and other hydrocarbon materials by primarily catalyzing hydrogen addition at carbon-sulfur bonds, thereby liberating the sulfur as hydrogen sulfide. The catalysts of the present invention are surprisingly and unexpectedly useful for hydrodesulfurization because the attractor species selectively attracts the catalyst to sulfur sites in the petroleum material where the catalytic metal can selectively catalyze removal of sulfur. Because the catalyst is selectively attracted to sulfur sites, non-productive (i.e., non-sulfur removing) side reactions that consume or waste valuable hydrogen can be reduced. Reducing hydrogen waste increases the economic viability of the hydrodesulfurization process relative to previously know hydrodesulfurization processes by decreasing the amount of hydrogen consumed per unit of sulfur removed.

The process for hydrodesulfurization includes steps of (1) providing a petroleum material that has a high sulfur content, (2) providing a plurality of bifunctional, oil-soluble catalyst complexes, (3) blending the plurality of catalyst complexes with petroleum material to form a homogeneous feedstock mixture, and (4) processing the homogeneous feedstock mixture under hydrodesulfurization conditions to form a product having a decreased sulfur content compared to the petroleum material.

A. Providing Petroleum or Other Hydrocarbon Material

The catalyst can be used with any petroleum or other hydrocarbon material that includes significant quantities of non-volatile sulfur-containing compounds. Examples of the types of sulfur-containing petroleum compounds that can be hydrodesulfurized with the catalysts of the present invention include, but are not limited to, thiols and thio ethers.

The processes of the present invention and the catalysts used therein have been found to be particularly useful in the hydrodesulfurization of sour crude oils. Sour crude oils include, but are not limited to, so-called "sour crude" and "sour-heavy crude." While these materials have been found to be particularly suited for the process of the present invention, the invention is not limited to hydroprocessing these hydrocarbon materials.

While the exact contents of sour crudes can vary, sour crude oil usually has significant quantities of non-volatile (i.e., non-$H_2S$) sulfur-containing compounds. According to one definition, sour crude includes any crude oil having a sulfur content greater than about 1 wt %. It is particularly desirable to desulfurize these oils because of the price premium paid for low-sulfur crudes. The processes and catalysts of the present invention have been found to be surprisingly effective for desulfurization of sour crude oils while consuming less hydrogen that other known catalytic desulfurization methods.

In one embodiment, The weight-percentage of sulfur in non-volatile sulfur containing compounds in the hydrocarbon material can be greater than about 10 wt %, more preferably, greater than about 3 wt %, even more preferably greater than about 1 wt %, and most preferably greater than about 0.5 wt %.

In one embodiment of the invention, the hydrocarbon material is a by-product of a petroleum refining process (i.e., a by-product from refining a distilled fraction of a crude oil). Examples of refining by-products include cycle oils and pyrolysis fuel oils.

The processes of the present invention and the catalysts used therein have been found to work surprisingly well to upgrade cycle oil, particularly heavy cycle oils. Cycle oils are a byproduct of fluid catalytic cracking. Cycle oils are oily hydrocarbons that have very low Ramsbottom carbon residue (in one embodiment the cycle oils are substantially free of Ramsbottom carbon residue) and have little to no heavies boiling over 950° F. In one embodiment, the carbon residue is less than 1.0 wt %, more preferably less than about 0.9 wt %, and most preferably less than about 0.8 wt % and the amount of heavies boiling above 950° F. is less than about 10 wt %, more preferably less than about 5 wt %, and most preferably less than about 2 wt %.

Another type of refining by-product particularly suited for use with the processes and catalysts of the invention is pyrolysis fuel oil, and particularly the heavy fraction of pyrolysis fuel oil. Pyrolysis fuel oil is a byproduct of steam cracking of naphtha and ethane to form olefins. Because of the complicated nature of the hydrocarbons in pyrolysis fuel oil, pyrolysis fuel oil is typically characterized by its source rather than the exact components that comprise this material.

The hydrocarbon feedstock can also be a blend of different hydrocarbons from different sources. In a preferred embodiment, the hydrocarbon feedstock contains at least about 20 wt % of a refining by-product, more preferably at least about 50 wt %, even more preferably at least about 75 wt %, even more preferably yet at least 90 wt %, and most preferably substantially all of the hydrocarbon feedstock used in the process is a by-product of a refining process obtained downstream from distillation.

B. Blending the Catalyst Complex with the Hydrocarbon Material

The catalyst complexes including a plurality of attractor species, catalytic metals, and organic ligands are blended into the petroleum material to form a conditional feedstock mixture. The catalyst can be blended directly into the petroleum material or the catalyst can be diluted in one or more steps prior to blending into the petroleum material. The step-wise dilution can facilitate intimate mixing of the catalyst and the petroleum material. The hydrocarbon used to carry out dilution can be the same material to be desulfurized, or alternatively, a different hydrocarbon can be used as the diluent. Examples of suitable diluents include vacuum gas oil, decant oil, or light gas oil. Suitable solvents include benzene, toluene, xylene, ethyl benzene, naphtha, mineral oil, mineral spirits, combinations thereof, and the like.

It has been found that pre-blending the catalyst with a hydrocarbon diluent to form a precursor mixture prior to blending the diluted precursor mixture with the petroleum material greatly aids in thoroughly and intimately blending the catalyst complex within the petroleum material, particularly in the relatively short period of time required for large-scale industrial operations to be economically viable. In one embodiment, the catalyst is blended with the diluent for a period of time in a range of about ½ minute to about 20 minutes, more preferably in a range from about 1 minute to about 10 minutes, and most preferably in a range of about 2 minutes to about 5 minutes. Increasing the vigorousness and/or shearing energy of the mixing process generally reduce the time required to effect thorough mixing.

The catalyst or the diluted catalyst is blended with the hydrocarbon feedstock to achieve a desired metal concentration. In one embodiment, the concentration of the catalyst in the feedstock is in a range from about 1 ppm to about 1,000 ppm, more preferably 10 ppm to about 750 ppm, and most preferably 50 ppm to about 500 ppm.

C. Hydrodesulfurization of Hydrocarbon Materials

The conditional feedstock mixture is reacted with hydrogen in the presence of catalyst of the invention under hydrodesulfurization conditions so as to decrease the concentration of sulfur in the feedstock.

The hydrodesulfurization process can be carried out in any reactor so long as intimate contact can be maintained between the catalyst, the hydrocarbon feedstock, and the free hydrogen gas stream throughout the hydrodesulfurization process. The reactor can be a continuous reactor, semi-continuous reactor, or a batch reactor. The compositions can be pre-mixed before entering the reactor or mixed within the reactor. The reactor can be equipped with a mechanical stirrer or a static mixer or a recirculating pump. In a preferred embodiment, the reactor is a continuous stream reaction vessel with a recirculating pump. Continuous reaction vessels have been found to work well due to the homogeneous nature of the catalyst.

The reaction temperature is selected to promote the removal of sulfur. The particular temperature for a given reaction can depend on the hydrocarbon feedstock being used and the decomposition temperature of the catalyst. In general, the hydrodesulfurization temperature can be in a range from about 300° C. to about 450° C. or higher. Lower temperatures within the range are typically preferred to hinder decomposition of the catalyst. In a preferred embodiment, the hydrodesulfurization temperature is in a range between about 410° C. and about 430° C.

Any suitable pressure can be used in the hydrodesulfurization process of the invention. The reaction pressure can range from about atmospheric pressure to about 10,000 PSIG. Preferably the pressure is in a range from about 450 PSIG and about 1900 PSIG. More preferably, the pressure is in a range from about 1400 PSIG and about 1500 PSIG.

Any suitable amount of hydrogen can be used in the hydrodesulfurization process of the invention. In general the hydrogen flow can be in a range from about 100 to about 20,000 cubic feet of hydrogen per barrel (SCFB). In a preferred embodiment, hydrogen flow is in a range from about 200 to about 2,000 SCFB.

The reaction time is selected to ensure removal of sufficient sulfur from the feedstock. In one embodiment, the reaction time is in a range from about 0.1 hour to about 48 hours, more preferably in a range from 1 hour to about 36 hours, most preferably in a range from about 2 hours to about 24 hours. For purposes of this invention, when using a continuous flow reactor, the reaction time is the residence time.

VI. EXAMPLES

The following examples provide formulas for making catalyst complexes according to the present invention and for using the catalyst complexes to upgrade hydrocarbon feedstocks that contain a high concentration of sulfur-containing compounds.

Example 1

Preparation of an Iron-Nickel-Sodium Catalyst

Example 1 describes a method for making a iron-nickel-sodium catalyst precursor with 60:15:25 weight ratio of Fe:Ni:Na.

80 g of nickel(II) hydroxide (STREM, Ni%=61.6) and 483 g of 2-ethyl hexanoic acid (Aldrich, 99%) were mixed together in a 1 liter flask and heated to 140° C. for 6 hours. The reaction yielded nickel 2-ethyl hexanoate containing 9.219 wt % Ni.

41.89 g of sodium stearate (Sodium content: 7.2 wt %, ACROS 26980010) was ultrasonically dissolved in 83.34 g of oleic acid. Then 60 g of iron naphthenate (iron content: 12 wt %, STREM, 26-2600) and 19.53 g of above nickel 2-ethyl hexanoate were added in, respectively. 95.46 g of the slurry oil L-1266 (Northwest Capital 975° F. Fraction from HTI-7466) was well mixed with above mixture. The final catalyst precursor contains 4.0 wt % metal.

Example 2

Preparation of an Iron-Nickel-Calcium Catalyst

Example 2 describes a method for making a iron-nickel-calcium catalyst precursor with 60:15:25 weight ratio of Fe:Ni:Ca.

80 g of nickel(II) hydroxide (STREM, Ni%=61.6) and 483 g of 2-ethyl hexanoic acid (Aldrich, 99%) were mixed together in a 1 liter flask and heated to 140° C. for 6 hours. The reaction yielded nickel 2-ethyl hexanoate containing 9.219 wt % Ni.

31.25 g of calcium naphthenate (calcium content: 4.0 wt %, STREM 93-2027), 25 g of iron naphthenate (iron content: 12 wt %, STREM, 26-2600) and 8.14 g of above nickel 2-ethyl hexanoate were well mixed by stirring. The final catalyst precursor contains 7.76 wt % metal.

Example 3

Preparation of a Molybdenum-Nickel Catalyst

Example 3 describes a method for making a molybdenum-nickel catalyst precursor with 80:20 weight ratio of Mo:Ni.

33.10 g of molybdic acid (Aldrich, MoO$_3$≧85.0%) and 108.13 g of 2-ethyl hexanoic acid (Acros, 99%) were mixed together in a 300 ml flask and then heated to 200° C. for 1 hour while stirring and purging with 100 ml/min of N2. The mixture was then purged for another 8 hours with a mixture of 20% H2 and 80% N2 at the same temperature. The reaction yielded molybdenum 2-ethyl hexanoate containing 16.46 wt % Mo.

80 g of nickel(II) hydroxide (STREM, Ni%=61.6) and 483 g of 2-ethyl hexanoic acid (Aldrich, 99%) were mixed together in a 1 liter flask and heated to 140° C. for 6 hours. The reaction yielded nickel 2-ethyl hexanoate containing 9.219 wt % Ni.

38.88 g of the molybdenum 2-ethyl hexanoate was mixed with 17.36 g of the nickel 2-ethyl hexanoate to yield a molybdenum-nickel catalyst precursor having 14.22 wt % metal.

Example 4

Preparation of an Iron-Nickel-Sodium Catalyst

Example 4 describes a method for making a iron-nickel-sodium catalyst precursor with 75:75:50 weight ratio of Fe:Ni:Na.

80 g of nickel(II) hydroxide (STREM, Ni%=61.6) and 483 g of 2-ethyl hexanoic acid (Aldrich, 99%) were mixed together in a 1 liter flask and heated to 140° C. for 6 hours. The reaction yielded nickel 2-ethyl hexanoate containing 9.219 wt % Ni.

13.89 g of sodium stearate (Sodium content: 7.2 wt %, ACROS 26980010) was ultrasonically dissolved in 27.78 g of oleic acid. Then 12.5 g of iron naphthenate (iron content: 12 wt %, STREM, 26-2600) and 16.27 g of above nickel 2-ethyl hexanoate were added in respectively. The final catalyst precursor contains 5.71 wt % metal.

Example 5

Preparation of a Molybdenum-Phosphorus Catalyst

Example 5 describes a method for making a molybdenum-phosphorus catalyst precursor with 200:133 weight ratio of Mo:P.

To make 200 g of 5,000 ppm molybdenum containing catalyst precursor, 6.667 g of molybdenum 2-ethyl hexanoate (OMG, Mo=15.0%) was mixed with 7.123 g of Bis(2-ethylhexyl) phosphate (Fluka, >95%, 14500). 186.21 g of the slurry oil L-1266 (Northwest Capital 975° F. Fraction from HTI-7466) was well mixed with above mixture.

Example 6

Preparation of a Molybdenum-Nickel-Phosphorus Catalyst

Example 6 describes a method for making a molybdenum-nickel-phosphorus catalyst precursor with 160:40:133 weight ratio of Mo:Ni:P.

264.64 g of molybdic acid (Aldrich, MoO3≧85.0%) and 863.85 g of 2-ethyl hexanoic acid (Acros, 99%) were mixed together in a 2 liter of round flask and then purged with 200 ml/min of N2 and then switched to 400 min of H2 then heated to 200-210° C. and hold for 24 hour while stirring. The produced molybdenum 2-ethyl hexanoate contains 15.71 wt % Mo.

80 g of nickel(II) hydroxide (STREM, Ni%=61.6) and 483 g of 2-ethyl hexanoic acid (Aldrich, 99%) were mixed together in a 1 liter flask and heated to 140° C. for 6 hours. The reaction yielded nickel 2-ethyl hexanoate containing 9.219 wt % Ni.

To make 200 g of 4,000 ppm molybdenum, 1,000 ppm nickel and 3,250 ppm phosphor containing catalyst precursor, 5.09 g of molybdenum 2-hexanoate (Wu-360, Mo=15.71%), 2.17 g of nickel 2-ethyl hexanoate and 7.123 g of Bis(2-ethylhexyl) phosphate (Fluka, >95%, 14500) were mixed together. 185.62 g of the slurry oil L-1266 (Northwest Capital 975° F. Fraction from HTI-7466) was well mixed with above mixture.

Example 7

Preparation of a Molybdenum-Phosphorus Catalyst

Example 7 describes a method for making a molybdenum-phosphorus catalyst precursor with 200:133 weight ratio of Mo:P.

264.64 g of molybdic acid (Aldrich, $MoO_3 \geqq 85.0\%$) and 863.85 g of 2-ethyl hexanoic acid (Acros, 99%) were mixed together in a 2 liter of round flask and then purged with 200 ml/min of $N_2$ and then switched to 400 ml/min of H2 then heated to 200-210° C. and hold for 24 hour while stirring. The produced molybdenum 2-ethyl hexanoate contains 15.71 wt % Mo.

To make 500 g of 5,000 ppm molybdenum containing catalyst precursor, 15.91 g of molybdenum 2-ethyl hexanoate (Wu-360, Mo=15.71%) was mixed with 17.81 g of Bis(2-ethylhexyl) phosphate (Fluka, >95%, 14500). 466.28 g of the slurry oil L-1266 (Northwest Capital 975° F. Fraction from HTI-7466) was well mixed with above mixture.

Example 8

Hydrodesulfurization Process

Example 8 describes the use of the catalyst of Example 1 for hydrodesulfurization of Saudi Arabian Crude Oil. A fresh feed with 200 wppm metal was made by mixing the catalyst from Example 1 with Saudi Arabian whole crude oil.

The reaction was run under reaction temperature 780° F., reaction pressure 1400 psig, the liquid hourly space velocity was 0.3 h-1. Samples were taken and held separately every 24 hours. The total process sulfur removal was 43.11%.

Example 9

Hydrodesulfurization Process

Example 9 describes the use of the catalyst of Example 1 for hydrodesulfurization of Saudi Arabian Crude Oil. A fresh feed with 400 wppm metal was made by mixing the catalyst from Example 1 with 500° F.+ fraction of Saudi Arabian Crude Oil.

The reaction was run under reaction temperature 770° F., reaction pressure 1400 psig, the liquid hourly space velocity was 0.35 h-1. Samples were taken and held separately every 24 hours. The sulfur removal based on feed was 24.50%.

Example 10

Hydrodesulfurization Process

Example 10 uses same catalyst as Example 9 and similar running conditions except the liquid hourly space velocity was 0.24 h-1. The sulfur removal based on feed was 28.22%.

Example 11

Hydrodesulfurization Process

Example 11 describes the use of the catalyst of Example 2 for hydrodesulfurization of Saudi Arabian Crude Oil. A fresh feed with 200 wppm metal was made by mixing the catalyst from Example 2 with Saudi Arabian whole crude oil.

The reaction was run under reaction temperature 780° F., reaction pressure 1400 psig, the liquid hourly space velocity was 0.3 h-1. Samples were taken and held separately every 24 hours. The total process sulfur removal was 29.96%.

Example 12

Hydrodesulfurization Process

Example 12 describes the use of the catalyst of Example 4 for hydrodesulfurization of Saudi Arabian Crude Oil. A fresh feed with 200 wppm metal was made by mixing the catalyst from Example 4 with the 500° F.+fraction of Saudi Arabian whole crude oil.

The reaction was run under reaction temperature 770° F., reaction pressure 1400 psig, the liquid hourly space velocity was 0.4 h-1. Samples were taken and held separately every 24 hours. The total process sulfur removal was 20.79%.

Example 13

Hydrodesulfurization Process

Example 13 describes the use of the catalyst of Example 5 for hydrodesulfurization of Saudi Arabian Crude Oil. A fresh feed with 50 wppm metal was made by mixing the catalyst from Example 5 with the 500° F.+ fraction of Saudi Arabian whole crude oil.

The reaction was run under reaction temperature 770° F., reaction pressure 1400 psig, the liquid hourly space velocity was 0.24 h-1. Samples were taken and held separately every 24 hours. The sulfur removal based on feed was 49.42%.

Example 14

Hydrodesulfurization Process

Example 14 uses same catalyst as Example 13 but different running conditions. The reaction pressure was 1500 psig and reaction temperature was 775° F. The sulfur removal based on feed was 51.37%.

Example 15

Hydrodesulfurization Process

Example 15 describes the use of the catalyst of Example 6 for hydrodesulfurization of Saudi Arabian Crude Oil. A fresh feed with 50 wppm metal was made by mixing the catalyst from Example 6 with the 500° F.+ fraction of Saudi Arabian whole crude oil.

The reaction was run under reaction temperature 775° F., reaction pressure 1500 psig, the liquid hourly space velocity was 0.24 h-1. Samples were taken and held separately every 24 hours. The sulfur removal based on feed was 50.33%.

Example 16

Hydrodesulfurization Process

Example 16 describes the use of the catalyst of Example 7 for hydrodesulfurization of Saudi Arabian Crude Oil. A fresh feed with 50 wppm metal was made by mixing the catalyst from Example 7 with the 500° F.+fraction of Saudi Arabian whole crude oil.

The reaction was run under reaction temperature 775° F., reaction pressure 1500 psig, the liquid hourly space velocity was 0.36 h-1. Samples were taken and held separately every 24 hours. The sulfur removal based on feed was 42.01%.

Example 17

Hydrodesulfurization Process

Example 17 describes the use of the catalyst of Example 7 for hydrodesulfurization of Saudi Arabian Crude Oil. A fresh feed with 50 wppm metal was made by mixing the catalyst from Example 7 with Saudi Arabian whole crude oil.

The reaction was run under reaction temperature 775° F., reaction pressure 1500 psig, the liquid hourly space velocity was 0.41 h-1. Samples were taken and held separately every 24 hours. The sulfur removal based on feed was 41.75%.

Example 18

Hydrodesulfurization Process

Example 18 describes the use of the catalyst of Example 7 for hydrodesulfurization of Saudi Arabian Crude Oil. A fresh feed with 50 wppm metal was made by mixing the catalyst from Example 7 with Saudi Arabian whole crude oil.

The reaction was run under reaction temperature 775° F., reaction pressure 1500 psig. The liquid hourly space velocity was 0.41 h-1 with 20% O-6 recycle. Samples were taken and held separately every 24 hours. The sulfur removal based on feed was 20.42%.

Table 1 summarizes the results for Examples 8-18.

TABLE 1

| Examples | Sulfur Removal (%) | Hydrogen Consumption (wt % Fresh Feed) |
|---|---|---|
| Example 8 | 43.11 | 0.90 |
| Example 9 | 24.50 | 0.59 |
| Example 10 | 28.22 | 0.62 |
| Example 11 | 29.96 | 0.44 |
| Example 12 | 20.79 | 0.31 |
| Example 13 | 49.42 | 1.04 |
| Example 14 | 51.37 | 0.84 |
| Example 15 | 50.33 | 0.88 |
| Example 16 | 42.01 | 0.78 |
| Example 17 | 41.75 | — |
| Example 18 | 20.42 | — |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A process for hydrodesulfurization of a hydrocarbon, the process for hydrodesulfurization comprising:
   providing an initial hydrocarbon having a high sulfur content;
   providing a bifunctional, oil-soluble catalyst comprised of a plurality of oil-soluble complexes, the oil-soluble complexes comprising:
      oil-soluble attractor complexes comprising at least one type of attractor species that is selectively attracted to sulfur sites in the hydrocarbon, wherein each oil-soluble each attractor species is bonded to one or more ligands by one or more functional groups,
      oil-soluble catalyst complexes comprising at least one type of catalytic metal that catalyzes the desulfurization of the hydrocarbon, wherein each catalytic metal atom is bonded to one or more ligands by one or more functional groups, and
      wherein at least some of the organic ligands are optionally bonded to both an attractor species and a catalytic metal atom;
   blending the bifunctional, oil-soluble catalyst with the hydrocarbon to form a feedstock mixture; and
   processing the feedstock mixture under hydrodesulfurization conditions to form a modified hydrocarbon product having a decreased sulfur content compared to the initial hydrocarbon.

2. A process for hydrodesulfurization as recited in claim 1, wherein the at least one attractor species comprises at least one atom selected from the group consisting of Na, Ca, P, S, and N.

3. A process for hydrodesulfurization as recited in claim 1, wherein the at least one attractor species comprises P.

4. A process for hydrodesulfurization as recited in claim 1, wherein the at least one catalytic metal is selected from the group consisting of group IV-B metals, V-B metals, VI-B metals, group VII-B metals, group VIII-B metals, and combinations thereof.

5. A process for hydrodesulfurization as recited in claim 1, wherein the at least one catalytic metal is selected from the group consisting of Fe, Ni, Co, Mo, W, Cr, V, Ti, Mn, and combinations thereof 6. A process for hydrodesulfurization as in claim 5, wherein the at least one catalytic metal is selected from the group consisting of Fe, Ni, Co, Mo, and combinations thereof 7. A process for hydrodesulfurization as recited in claim 1, wherein the at least one attractor species comprises an atom having a least one empty p-orbital that is preferentially attracted to the unbound p-orbital electrons present in the sulfur-containing compounds in the hydrocarbon.

8. A process for hydrodesulfurization as recited in claim 1, wherein the one or more organic ligands comprise an aliphatic or an aromatic ligand having at least one functional group selected from the group consisting of alcohols, carboxylic acids, esters, phospho esters, ketones, and combinations thereof 9. A process for hydrodesulfurization as recited in claim 1, wherein the one or more organic ligands comprise at least one aromatic ring structure.

10. A process for hydrodesulfurization as recited in claim 9, wherein the at least one aromatic ring structure comprises a fused ring structure.

11. A process for hydrodesulfurization as recited in claim 9, wherein the at least one aromatic ring structure comprises a naphthenate having at least one carboxylic acid functional group.

12. A process as in claim 1, wherein the initial hydrocarbon comprises sour crude or sour-heavy crude having a sulfur content greater than about 0.5 wt %.

13. A process for hydrodesulfurization as recited in claim 1, wherein the initial hydrocarbon comprises a by-product of a catalytic upgrading process.

14. A process for hydrodesulfurization as recited in claim 1, wherein the concentration of the bifunctional, oil-soluble catalyst in the feedstock mixture is in a range from about 1 ppm to about 1000 ppm.

15. A process for hydrodesulfurization as recited in claim 1, wherein the oil-soluble attractor complexes and the oil-soluble catalyst complexes are mixed together to form the bifunctional, oil-soluble catalyst.

16. A process for hydrodesulfurization as recited in claim 1, wherein the oil-soluble attractor complexes and the oil-soluble catalyst complexes cross-react to form polymolecular catalyst complexes.

17. A process for hydrodesulfurization as recited in claim 1, wherein the bifunctional, oil-soluble catalyst comprises bi-functional organic ligands that are bonded to both an attractor species and a catalyst metal atom.

18. A process for hydrodesulfurization of a petroleum material product, the process for hydrodesulfurization comprising:
   providing an initial petroleum material having a high sulfur content;
   providing a bifunctional, oil-soluble catalyst comprised of a plurality of oil-soluble complexes, the oil-soluble complexes comprising:
      at least one type of catalytic metal that catalyzes the desulfurization of the petroleum material, wherein the at least one type of catalytic metal is selected from the group consisting of group IV-B metals, V-B metals, VI-B metals, group VII-B metals, group VIII-B metals, and combinations thereof,
      at least one type of attractor species that is selectively attracted to sulfur sites in the petroleum material, wherein the at least one type of attractor species is selected from the group consisting of Na, Ca, P, S, N, and combinations thereof,
      one or more first organic ligands directly bonded to each catalytic metal atom by one or more functional groups of the first one or more organic ligands so as to form oil-soluble catalyst complexes, and
      one or more second organic ligands directly bonded to each attractor species by one or more functional groups of the second one or more organic ligands so as to form oil-soluble attractor complexes;
   blending the bifunctional, oil-soluble catalyst with the initial petroleum material to form a feedstock mixture; and
   hydroprocessing the feedstock mixture in a reactor under hydrodesulfurization conditions in the presence of gaseous hydrogen, thereby forming a modified petroleum product having a decreased sulfur content compared to the initial petroleum material.

19. A process as in claim 18, wherein the hydrodesulfurization conditions comprise processing the feedstock mixture at a temperature in a range between about 300° C. and about 450° C.

20. A process as in claim 18, wherein the hydrodesulfurization conditions comprise processing the feedstock mixture at a temperature in a range between about 410° C. and about 430° C.

21. A process as in claim 18, wherein the hydrodesulfurization conditions comprise processing the feedstock mixture at a pressure in a range between about 450 PSIG and about 1900 PSIG.

22. A process as in claim 18, wherein the hydrodesulfurization conditions comprise processing the feedstock mixture at a pressure in a range between about 1400 PSIG and about 1500 PSIG.

23. A process as in claim 18, wherein the sulfur content of the modified petroleum product is reduced by at least 40% as compared to the initial petroleum material.

24. A process as in claim 18, wherein the sulfur content of the modified petroleum product is reduced by at least 60% as compared to the initial petroleum material.

25. A process for hydrodesulfurization as recited in claim 18, wherein the oil-soluble attractor complexes and the oil-soluble catalyst complexes are mixed together and/or cross-react to form polymolecular catalyst complexes.

26. An oil-soluble, bi-functional catalyst for desulfurization of a hydrocarbon material, the oil-soluble, bi-functional catalyst comprising an organometallic compound or composition, the organometallic compound or composition comprising:
   oil-soluble attractor complexes comprising at least one type of attractor species that preferentially attracts the oil-soluble, bi-functional catalyst to sulfur sites in a hydrocarbon material that includes a proportion of sulfur-containing compounds, wherein each oil-soluble each attractor species is bonded to one or more ligands by one or more functional groups;
   oil-soluble catalyst complexes comprising at least one type of catalytic metal selected from the group consisting of group VIII-B metals, group VII-B metals, group VI-B metals, group V-B metals, or group IV-B metals, and combinations thereof, wherein each catalytic metal atom is bonded to one or more ligands by one or more functional groups; and
   wherein at least some of the organic ligands are optionally bonded to both an attractor species and a catalytic metal atom.

27. An oil-soluble, bi-functional catalyst as in claim 26, wherein the at least one attractor species comprises a cation with an oxidation state between 1+ and 6+.

28. An oil-soluble, bi-functional catalyst as in claim 27, wherein the cation has an oxidation state of 5+.

29. An oil-soluble, bi-functional catalyst as in claim 26, wherein the at least one attractor species is selected from the group consisting of atoms of and/or functional groups containing Na, Ca, P, S, or N, and combinations thereof.

30. An oil-soluble, bi-functional catalyst as in claim 26, wherein the at least one attractor species is comprised of P.

31. An oil-soluble, bi-functional catalyst as in claim 26, wherein the at least one attractor species comprises an atom having a least one open p-orbital that is preferentially attracted to an unbound p-orbital electron pair present on sulfur.

32. An oil-soluble, bi-functional catalyst as in claim 26, wherein the at least one catalytic metal is selected from the group consisting of tungsten (W), molybdenum (Mo), chromium (Cr), nickel (Ni), cobalt (Co), iron (Fe), vanadium (V), titanium (Ti), or manganese (Mn), and combinations thereof.

33. An oil-soluble, bi-functional catalyst as in claim 26, wherein the one or more organic ligands comprise a straight or branched aliphatic chain having between 2 and 20 carbon atoms.

34. An oil-soluble, bi-functional catalyst as in claim 26, wherein the one or more organic ligands comprise at least one aromatic ring structure.

35. An oil-soluble, bi-functional catalyst as in claim 34, wherein the at least one aromatic ring structure comprises a fused ring structure.

36. An oil-soluble, bi-functional catalyst as in claim 34, wherein the at least one aromatic ring structure comprises a naphthenate.

37. An oil-soluble, bi-functional catalyst as in claim 26, wherein the oil-soluble attractor complexes and the oil-soluble catalyst complexes are mixed together to form the oil-soluble, bifunctional catalyst.

38. An oil-soluble, bi-functional catalyst as in claim 26, wherein the oil-soluble attractor complexes and the oil-soluble catalyst complexes cross-react to form polymolecular catalyst complexes.

39. An oil-soluble, bi-functional catalyst as in claim 26, wherein the oil-soluble, bifunctional catalyst comprises bi-functional organic ligands that are bonded to both an attractor species and a catalyst metal atom.

* * * * *

UNITED STATES PATENT AND TRADEMARK OFFICE
CERTIFICATE OF CORRECTION

PATENT NO. : 8,097,149 B2
APPLICATION NO. : 12/140629
DATED : January 17, 2012
INVENTOR(S) : Wu et al.

It is certified that error appears in the above-identified patent and that said Letters Patent is hereby corrected as shown below:

Column 2
Line 21, change "to higher" to --to a higher--

Column 5
Line 40, change "thereof" to --thereof.--

Column 6
Line 2, change "in the petroleum" to --petroleum--
Line 13, change "foe" to --for--

Column 9
Line 62, change "atoms of" to --atoms--

Column 14
Line 19, change "making a" to --making an--
Line 46, change "with" to --with the--
Line 58, change "liter of" to --liter--

Column 15
Line 21, change "hour" to --hours--
Line 30, change "with" to --with the--
Line 65, change "uses" to --uses the--

Column 16
Line 44, change "uses" to --uses the--

Signed and Sealed this
Fourteenth Day of August, 2012

David J. Kappos
*Director of the United States Patent and Trademark Office*

Column 18
Line 35, change "thereof" to --thereof.--
Line 38, change "thereof" to --thereof.--
Line 50, change "thereof" to --thereof.--